United States Patent [19]

Nierenberg

[11] 3,973,934

[45] Aug. 10, 1976

[54] APPARATUS FOR DIFFUSION SEPARATION

[75] Inventor: William A. Nierenberg, Ann Arbor, Mich.

[73] Assignee: The United States of America as represented by the United States Energy Research and Development Administration, Washington, D.C.

[22] Filed: Feb. 23, 1949

[21] Appl. No.: 77,848

[52] U.S. Cl. .................................................. 55/158
[51] Int. Cl.² .................... B01D 13/00; B01D 59/12
[58] Field of Search ........... 23/14.5; 183/2.2, 115.0; 55/16, 158

[56] References Cited
UNITED STATES PATENTS

| 1,486,521 | 3/1924 | Hertz | 55/17 |
| 1,498,097 | 6/1924 | Hertz | 55/158 |
| 2,159,434 | 5/1939 | Frey | 55/16 X |
| 2,268,134 | 12/1941 | Clusius | 55/81 |
| 2,500,240 | 3/1950 | Bowman | 55/158 |
| 3,792,570 | 2/1974 | Biondi et al. | 55/158 |

OTHER PUBLICATIONS

Cohen, "Nucleonics," June 1948, vol. 2, No. 6, pp. 3–9.

*Primary Examiner*—Charles N. Hart
*Assistant Examiner*—R. W. Burks
*Attorney, Agent, or Firm*—Dean E. Carlson; Leonard Belkin

EXEMPLARY CLAIM

1. A diffuser separator apparatus which comprises a plurality of flow channels in a single stage, each of said channels having an inlet port and an outlet port and a constant cross sectional area between said ports, at least a portion of the defining surface of each of said channels being a diffusion separation membrane, and each of said channels having a different cross sectional area, means for connecting said channels in series so that each successive channel of said series has a smaller cross sectional area than the previous channel of said series, a source of gaseous mixture, individual means for flowing said gaseous mixture to the inlet port of each of said channels, gas receiving and analyzing means, individual means for flowing gas passing from each of said outlet ports and means for flowing gas passing through said membranes to said receiving and analyzing means, and individual means for connecting the outlet port of each channel with the inlet port of the channel having the next smaller cross sectional area.

5 Claims, 6 Drawing Figures

INVENTOR.
WILLIAM A. NIERENBERG
BY
Roland A. Anderson
Attorney

INVENTOR.
WILLIAM A. NIERENBERG
BY
Roland A. Anderson
Attorney

APPARATUS FOR DIFFUSION SEPARATION

The present invention relates to a method and apparatus for separating the components of a gaseous mixture by diffusion through a finely porous, permeable metal membrane. The method and the apparatus of the invention are particularly well adapted for use in connection with the diffusion separation of different isotopic species of an element or compound and will be so described, athough as the description proceeds it will become apparent that they may be used equally well in connection with the separation of other gaseous mixtures.

In recent years a number of isotopes of elements have been discovered which possess interesting and useful characteristics and it has become desirable to develop methods of separating and concentrating such isotopes so that they may be studied and used. Because of the chemical identity of the isotopes of an element, the problem of separating isotopes is a difficult one. Various methods have been previously proposed for effecting such a separation, among which is the so-called "diffusion method" wherein a gaseous mixture of isotopic species of an element or compound of the element is passed into contact with a finely porous, permeable membrane and a portion of the gaseous mixture is caused to flow through the membrane. Under such circumstances, the fraction of the mixture that passes through the membrane is enriched somewhat with respect to the lighter component of the mixture. The extent to which enrichment takes place in a single diffusion stage, i.e., a single passage of the mixture into contact with the diffusion membrane, is usually relatively small and several methods of multiplying this effect have been considered.

In accordance with one such proposal, a number of diffusion stages are interconnected in series in a so-called cascade in such manner that the fraction of gas diffusing through the membrane passes on to a succeeding or higher stage of the cascade and the fraction of the gas that does not diffuse through the membrane is recycled to an earlier or lower stage of the cascade. Gaseous mixture of normal isotopic abundance may be fed to an appropriate point in the middle of the cascade, gas enriched with respect to the lighter component may be withdrawn from the top of the cascade and gas enriched with respect to the heavier constituent may be withdrawn from the bottom of the cascade.

In cases where separating the isotopes is particularly difficult as, for example, where it is desired to separate the isotopes of uranium by diffusional separation of uranium hexafluoride, a very large number of diffusion stages are required and hence a considerable quantity of the process gas is held up in the system at any given time. In other words, a relatively large quantity of the process gas is required in order to operate the cascade at all. There are numerous instances where such a large quantity of the gaseous mixture may not be available and in such cases it is necessary that a different type of separative method be used.

In the construction of the cascade, such as that described above, the manufacture of suitable porous, permeable membranes presents a major problem. In order to operate efficiently as a diffuser-separator, such membranes must have exceedingly fine holes, i.e., holes that are smaller in diameter than the wave length of visible light. As an incident of the manufacture of such membranes it is desirable to have a simple and satisfactory method of testing their separation efficiency. The membranes may be tested in a variety of ways such as, for example, by passing a gas mixture of known composition into contact with the membrane and determining the change in composition that occurs as the gas passes through the membrane.

In cases where the membrane is to be used in contact with an isotopic gaseous mixture which is either difficultly separable or highly corrosive, or both, it is frequently desirable that the membrane be tested in contact with the process gas that is to be used in the diffusion separation cascade. For example, in testing the separation efficiency of membranes for separation of the isotopic species of uranium in uranium hexafluoride gas, the corrosive properties of said gas cause the separation indices to undergo change particularly during the initial exposure of said gas to such membranes because corrosion products formed in the pores of the membrane alter the pore diameter corresponding to the separation indices. In making a test of this character a special problem is also presented where a process gas such as $UF_6$ is used because of the very small change in composition that occurs in a single pass through the membrane. This change in composition may be of the same order of magnitude as the probable error in the analytical method used to analyze the gas mixture.

Accordingly, it is important that the testing method used be of such a character as to produce large separation so that the normal analytical errors do not produce an unduly large error in the final results. It is also important that the nature of the method used be such that it can be carried out in apparatus of conveniently small size and within a reasonable length of time. One problem that is encountered in attempting to test permeable membranes under these conditions arises in the self-diffusive tendency of the gas. As the gaseous mixture flows across the face of the membrane a portion of the gas diffuses through the membrane, the velocity of the stream tends to decrease. If the diffused gas constitutes a large portion of the total gas fed, the velocity of the stream may drop to the point where back diffusion in a direction opposite to the direction of the flow of the stream becomes significantly large. Such back diffusion decreases the overall separation obtainable. In order to minimize the effect of the back diffusion it has been customary to use relatively "low cut," i.e., to operate under such conditions that only a relatively small portion (e.g., about 50 percent by volume) of the gas is caused to diffuse through the membrane so that the decrease in velocity of the stream is small. However, when such a "low cut" is used the concentration difference achieved in the separation of a quantity of mixture fed to the membrane is substantially smaller than that achieved using "high cut" procedures.

One previously disclosed method which overcomes the back diffusion of gas which has not diffused through the membrane, which back diffusion arises from the partial reduction in velocity that tends to occur when relatively "high cut" separation methods are employed, comprises causing a stream of the gaseous mixture to flow across one face of the finely porous, permeable membrane under such conditions that a larger fraction of the mixture diffuses through the membrane and the cross sectional area of the stream is decreased as it flows across the face of the membrane to offset at least partially the reduction in velocity of the gas stream. An apparatus which was used in connection with such a method comprised a triangular diffusion chamber such that gas could be fed at the base of said triangle to be passed across the face of a membrane in said chamber and the undiffused portion thereof withdrawn at the apex of said triangle.

Membranes employed in diffuser separation processes are preferably tested with mixtures of inert gas having relatively large differences in molecular weight prior to their employment in the diffusion processes such as processes for the separation of the isotopes of uranium, because of the greater ease with which such inert gaseous mixtures may be handled and correspondingly higher separation effected. It has been difficult to correlate the separation characteristics of inert gases and uranium hexafluoride employing the triangle separation apparatus described above.

It is accordingly an object of the present invention to provide a high cut method and apparatus for testing separating efficiencies of porous, permeable membranes for both inert, easily separable gaseous mixtures and corrosive, difficultly separable gaseous mixtures wherein the results of testing may be correlated and the separation efficiency of membranes for difficultly separable corrosive mixtures may be determined from tests with inert gas mixtures which are easily separable.

It is a further object of the present invention to provide an improved method and apparatus for separating the components of a difficultly separable gaseous mixture by diffusion through a finely porous, permeable membrane.

It is a still further object of the present invention to provide an apparatus which is operative with a relatively small quantity of gaseous mixture.

Other objects will be in part apparent and in part pointed out hereinafter.

In one of its broader aspects the method of the present invention is a method of concentrating the components of a gaseous mixture which comprises passing a stream of said mixture successively into contact with a plurality of diffusion separation membranes, diffusing a portion of said stream through each of said membranes, maintaining the cross sectional area of said stream at a constant value while in contact with each of said membranes and maintaining the stream at successively smaller cross sectional areas while in contact with successive membranes respectively.

An apparatus suitable for carrying out the method of the present invention comprises in general a plurality of flow channels, each of said channels having an inlet port and an outlet port and a constant cross sectional area between said ports, at least a portion of the defining surface of each of said channels being a diffusion separation membrane, and each of said channels having a different cross sectional area, means for connecting said channels in series so that each successive channel of said series has a smaller cross sectional area than the previous channel of said series, a source of gaseous mixture, individual means for flowing said gaseous mixture to the inlet port of each of said channels, gas receiving and analyzing means, individual means for flowing gas passing from each of said outlet ports and for flowing gas passing through said membranes to said receiving and analyzing means.

The clarity of the explanation of a particular embodiment is increased by reference to the figures wherein.

According to one embodiment of the present invention gas is passed through two relatively shallow channels in a diffusion separation element generally designated by the number 100, one of said channels being broader than the other. While passing through the channels of the diffuser separator unit 100 a portion of the gas passes through porous, permeable membranes which form one wall of each of said channels into a low pressure enclosure from which it is withdrawn and an undiffused portion passes from said channels.

Figure 1:
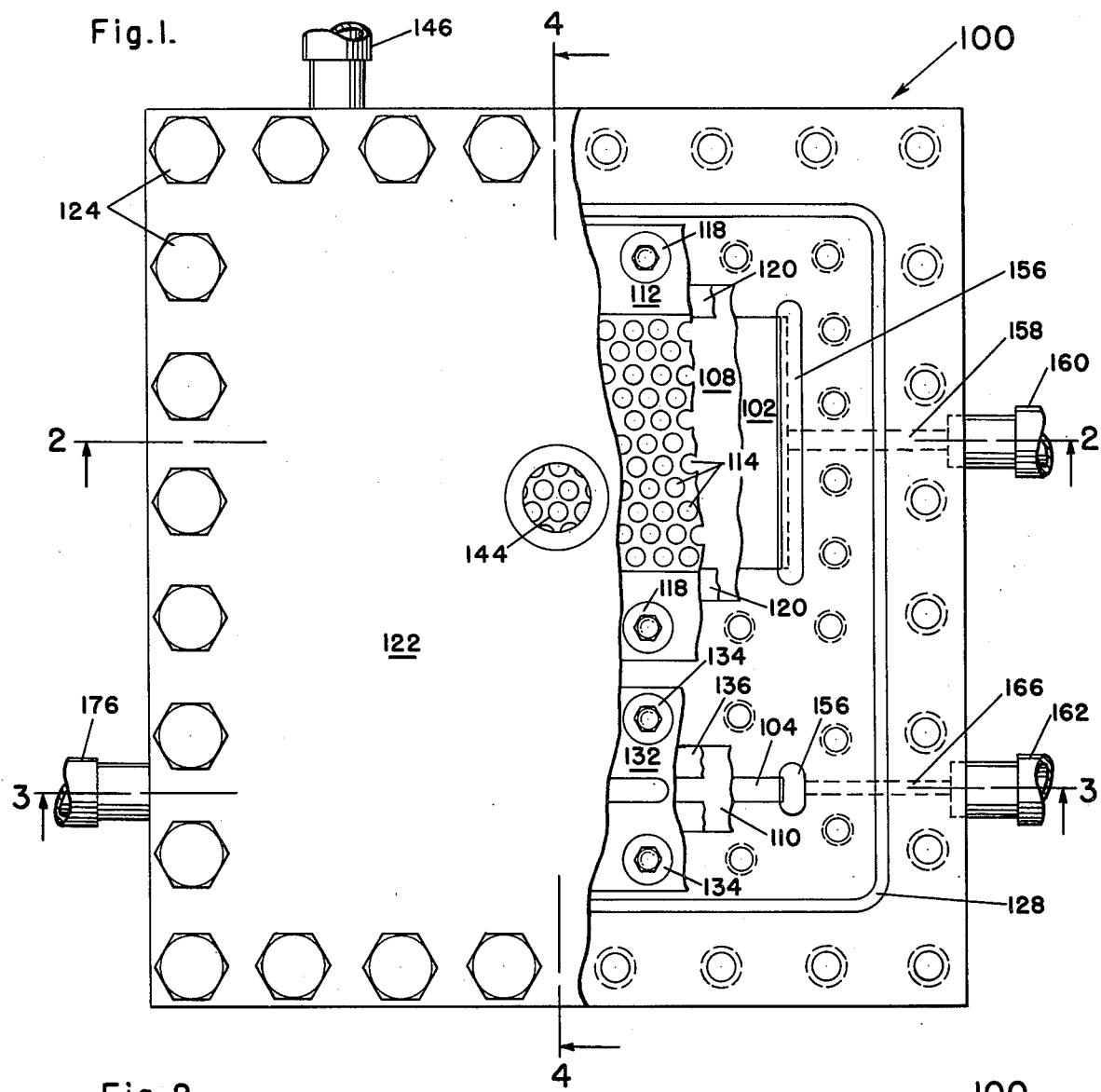
FIG. 1 is a top plan view of a diffuser separator unit adapted to be used in carrying out the method of the present invention, a portion of the cap and of the sealing plates therein being broken away to show portions of the interior of the unit.
Figure 2:
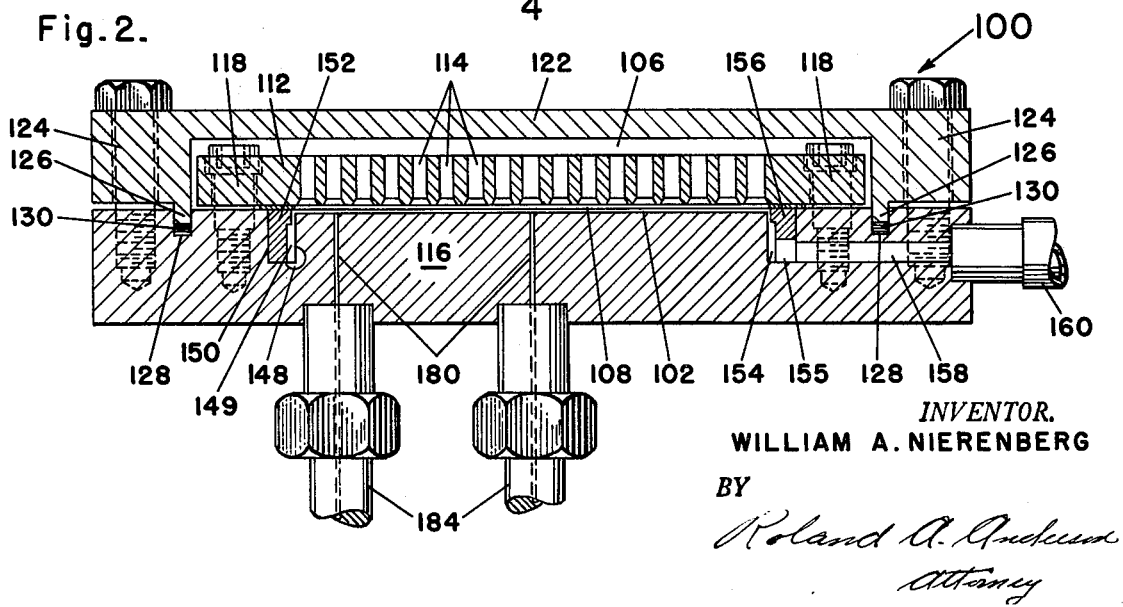
FIG. 2 is a vertical section through the diffuser separator unit taken on a line 2—2 of FIG. 1 and showing the diffusion membrane and adjacent flow passages through the larger of said passages.

Referring to the FIGS. 1 and 2 the gaseous mixture to be diffusively separated enters a diffuser separator unit 100 through the conduit 146 at the back thereof, which conduit communicates with a channel 148 in the base plate 116 of the diffuser unit 100. The gas passes up from the channel 148 through the channel 149 to enter the broader shallow channel 102 formed as a depression in the base plate 116. It has been found preferable to provide a stream of gas at the entrance to the channel 102 from the channel 149 of the same dimensions as the channel 102. For this reason a larger depression 150 is formed in the base plate 116 of the diffuser 100 and a key 152 is fitted into this depression to reduce the size of that portion of the channel 149 which communicates with the channel 102 to the dimensions of the channel 102. Gas flows through the channel 102 and in so flowing comes into contact with a broader diffusion separation membrane 108 through which a portion of said gas diffuses. The undiffused portion of gas leaves the channel 102 through the exit channel 154 formed in the base plate 116 of the diffuser unit 100. The portion of the exit channel 154 which communicates with the exhaust end of the channel 102 is provided with the proper dimensions by fitting the key 156 into the depression 155 formed in the base plate 116 of the diffuser unit 100. The gas leaving the channel 102 through channel 154 passes in turn through the exit channel 158 into the conduit 160.

Figure 5:
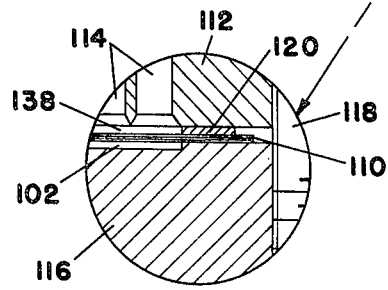
FIG. 5 is an enlargement of a detail of the gasketing arrangement in FIG. 4.

The pressure of the gas flowing through the channel 102 is measured by gauges (not shown) which communicate with said channel 102 through the pressure taps 180 in the base plate 116 of the diffuser unit 100 and through the conduits 184 connecting with said pressure taps. The portion of the gas flowing in the channel 102 which diffuses through the membrane 108 flows in turn through the perforations 114 in the perforated seal plate 112 to the low pressure enclosure 106. The seal plate 112 serves to press the porous, permeable membrane 108 against the perimeter of the broad channel 102 thereby forming a gas-tight seal at the perimeter of the membrane 108 between the seal plate 112 and the membrane 108 with the aid of the gasket 120. The details of this gasket arrangement are most apparent in FIG. 5. Pressure is caused to be exerted between the perforated seal plate 112 and the base plate 116 of the holder 100 by tightening the bolts 118. Gas passing through the perforations 114 in the seal plate 112 is withdrawn from a low pressure enclosure 106 through a conduit 144 attached to the cap plate 122 of the holder 100. A seal is formed between the cap plate 122 and the base plate 116 by the insertion of the tongue 126 downwardly projecting from the cap plate 122 at the perimeter thereof into the groove 128 similarly located at the perimeter of the base plate 116. A gas-tight seal between the tongue 126 and the groove 128 is insured by compression in the groove 128 of the soft metal gasket 130 due to the pressure exerted between the cap plate 122 and the base plate 116 as a result of the tightening of the bolts 124.

Figure 3:
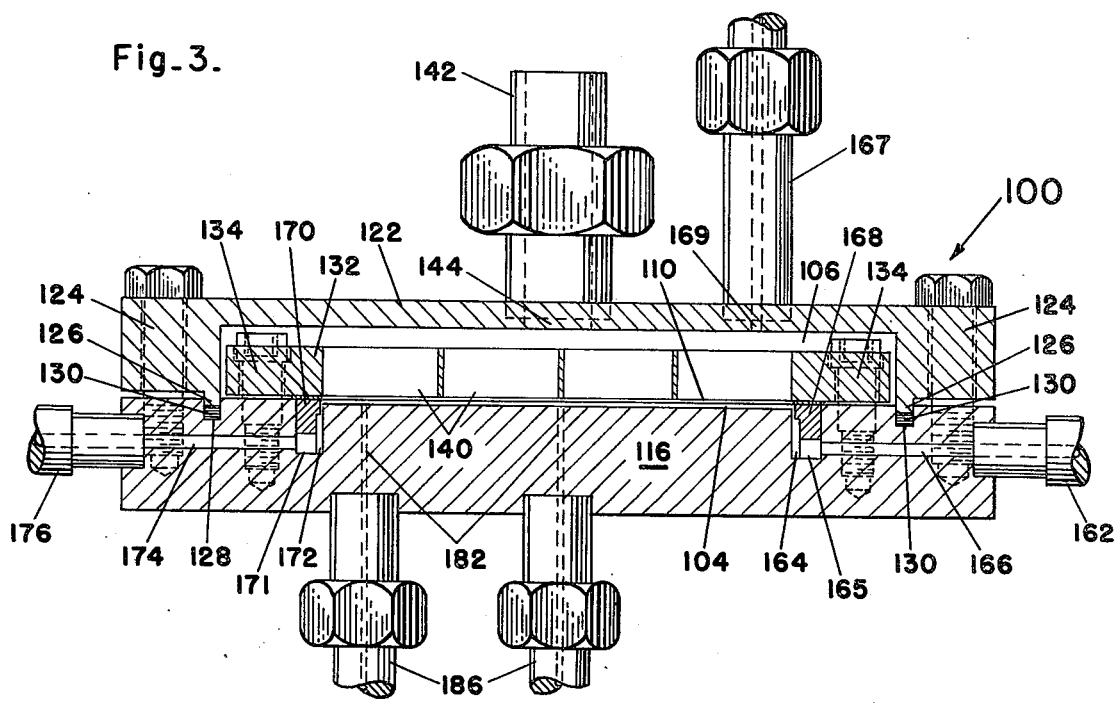
FIG. 3 is a vertical section through the diffuser separator unit taken on the line 3—3 of FIG. 1 and showing the membrane and the adjacent gas flow passages of the smaller of said passages.
Figure 4:
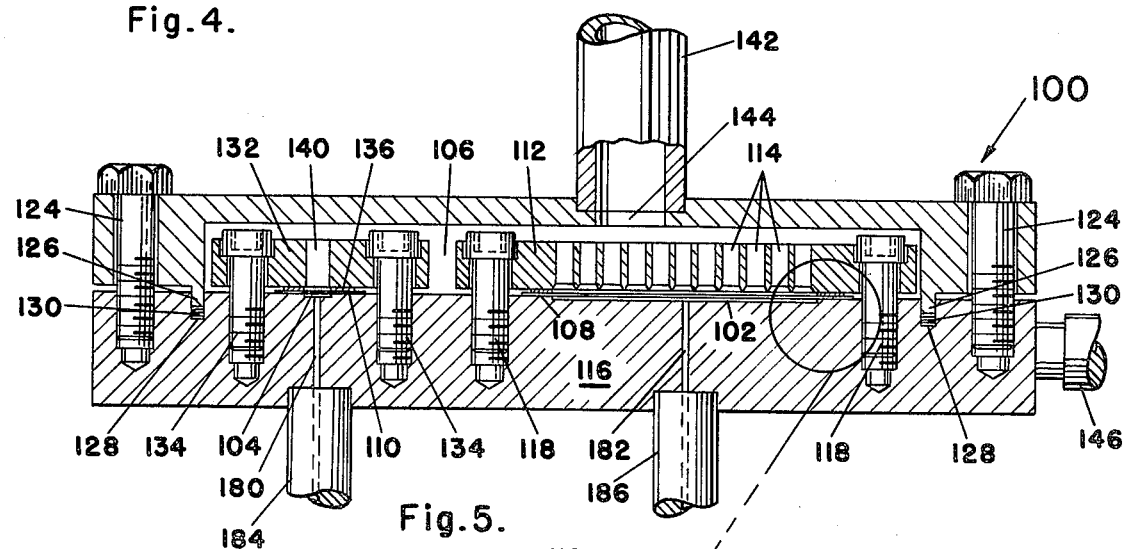
FIG. 4 is a vertical section through the diffuser separator unit taken on a line 4—4 of FIG. 1 showing the endwise view of the flow passages in the separator.

Referring now to FIGS. 1 and 3 a gas may be passed through a narrower channel 104 in the base plate 116 by introducing said gas through the inlet conduit 162 and the inlet channels 166 and 164 formed in the base plate 116. An inlet to the narrower passage 104 having the same dimensions as said passage is provided at the junction of the conduits 104 and 164 by inserting the key 168 into the depression 165. Gas flows from the channel 164 through the channel 104 and makes contact with a membrane 110 in so flowing. The pressure of the gas in channel 104 is measured by pressure gauges (not shown) which are connected to the channel 104 through the conduits 186 which connect with the pressure taps 182 in the base plate 116 of the diffuser unit 100. The portion of the gas flowing through the channel 104 which does not diffuse through the membrane 110 passes from said channel 104 through the exit channel 172. The portion of the channel 172 connecting with the channel 104 is made to have the same dimensions as said channel 104 by the insertion of the key 170 in the depression 171 in the base plate 116. Gas passing from the channel 104 through the exit channel 172 passes in turn through the exit channel 174 which communicates with the exhaust conduit 176.

The portion of the gas which diffuses through the membrane 110 passes through the openings 140 in the seal plate 132 to the low pressure enclosure 106. A gas-tight seal is provided at the perimeter of the membrane 110 where it contacts the base plate 116 by causing a pressure to be exerted between the seal plate 132 and the base plate 116 by tightening the bolts 134 holding the seal plate 132 in position above the channel 104. The pressure of the seal plate 132 on the periphery of the channel 104 is caused to be evenly distributed by the inclusion of the gasket 136 between the seal plate 132 and the membrane 110. The pressure in the enclosure 106 may be measured through the opening in the conduit 167 communicating with the opening 169 in the cap plate 122. Gas is exhausted from the enclosure 106 through the conduit 142 communicating with the opening 144 in the cap plate 122.

Figure 6:
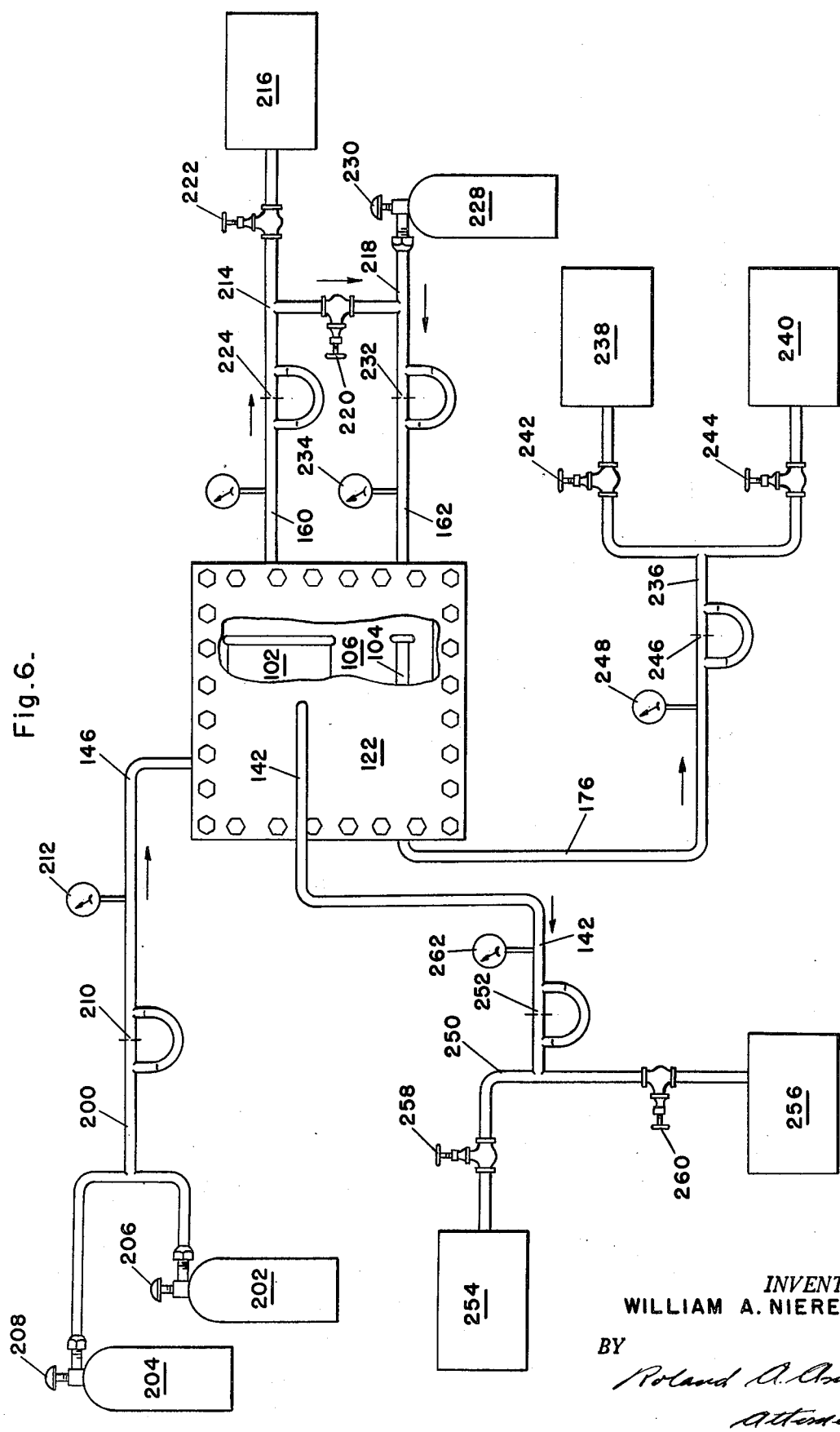
FIG. 6 is a schematic diagram of the arrangement of the diffuser separator and the auxiliary equipment suitable for carrying out the method of the present invention.

Referring now to FIG. 6 the operation of the apparatus heretofore described consists in general of the passage of a difficultly separable gaseous mixture such as a gaseous mixture of uranium isotopes through the channels 102 and 104, when said channels are connected in tandem relation in order to determine the separation efficiency of the membranes therein with respect to the difficultly separable mixture, and separation of an easily separable gaseous mixture such as a mixture of helium and carbon dioxide by the passage of such easily separable gaseous mixture into contact with each of said membranes individually. In particular, an inert gas mixture is supplied to the channel 102 through the conduit 146 and flowmeter 210 and the manifold 200 by opening the valve 208 to the inert gas supply tank 204, valve 206 being kept closed. The pressure of the gas entering the chamber 102 is measured by the gauge 212 in the conduit 146. The portion of the gas entering the channel 102 from the conduit 146 which does not diffuse through the membrane 108 passes from said channel 102 through the conduit 160, the flowmeter 224, the manifold 214 and the valve 222 which is kept open, to the inert gas collection and analysis apparatus 216. Flow of said gas from the manifold 214 to the manifold 218 is prevented by maintaining the valve 220 in a closed position. The portion of the gas entering the channel 102 from the conduit 146 which diffuses through the membrane 108 into the enclosure 106 leaves said enclosure through the conduit 142 and passes in turn through the flowmeter 252 and the manifold 250 and valve 258 to the inert gas and collection apparatus 254, valve 260 being kept closed. When an analyzable sample of the inert gas has been collected in the inert gas collection and analysis apparatus 216 and 254, the valves 208 and 222 are closed and the inert gas remaining in the system is exhausted from the diffuser unit 100 and appurtenant apparatus, and the collected samples are analyzed. From this analysis determination of the separation efficiency of the membrane 108 with respect to the inert gas is made.

Inert gaseous mixture is passed into the narrower channel 104 through the conduit 162, the flowmeter 232, and the manifold 218 from the inert gas supply tank 228 by opening valve 230, valve 220 being kept closed. The pressure of the gas entering the conduit 104 is measured by means of the gauge 234. The portion of the gas entering the channel 104 which passes therethrough without diffusing through the membrane 110 leaves said channel 104 through the exhaust conduit 176 and passes thereafter through the flowmeter 246, the manifold 236 and the valve 242 into the inert gas collection and analysis apparatus 238, valve 244 being kept closed. The pressure of the gas leaving the chamber 104 is measured by means of the gauge 248 connecting with the conduit 176. The portion of the gas entering the channel 104 which diffuses through the membrane 110 flows through the low pressure chamber 106 and leaves said chamber through the exhaust conduit 142 and passes to the inert gas collection and analysis apparatus 254 through the flowmeter 252, the manifold 250 and the valve 258, valve 260 being kept closed. Flow of inert gas through the channel 104 is continued until an analyzable sample of the diffusate collected in the apparatus 254, and of the rejected portion collected in the apparatus 238, have been obtained. The inert gas is thereafter evacuated from the system and the valves 230, 242 and 258 are closed. The collected samples of the gas passed through the chamber 104 are analyzed and the separation efficiency of the membrane 110 for this gas mixture is determined.

It may thus be seen that the apparatus of the present invention facilitates the measurement of the separation characteristics of the individual membranes with inert gas samples. The aforementiond separation procedures were carried out at relatively low cuts, that is, the ratio of the quantity of gas which passes through the membranes to the quantity of gas which passes over said membranes without passing therethrough is approximately equal to one. It is preferred to employ such relatively low cuts in order to minimize the back diffusion of the gas in the high pressure chambers 102 and 104 countercurrent to the flow of the undiffused gas therethrough.

The apparatus of the present invention may also be employed to separate difficultly separable gaseous mixtures at relatively high cuts, e.g., in the order of 9.0 by passing said difficultly separable mixture through the chambers 102 and 104 when said chambers are connected in tandem relation. Referring to FIG. 6 a mixture of difficultly separable gases such as a gaseous mixture of uranium isotopes is passed into the channel 102 from the inlet conduit 146, the flowmeter 210, and the manifold 200, by opening the valve 206 connecting with the uranium hexafluoride supply tank 202, valve 208 being kept closed during this operation. The portion of the gaseous mixture which passes through the channel 102 without diffusing through the membrane 108, passes from the channel 102 through the conduit 160 and the flowmeter 224. In order to supply the undiffused gas exhausted from the channel 102 to the channel 104, the valve 220 is opened and the gas is allowed to flow from the flowmeter 224 through the manifold 214, the valve 220, the manifold 218, and the flowmeter 232 to the inlet conduit 162. The gas mixture flows into the channel 104 from the conduit 162 and flows from said channel through the exhaust conduit 176, flowmeter 246, manifold 236 and the valve 244 to the $UF_6$ collection and analysis apparatus 240. A portion of the gas passing through the channel 102 and a portion of that passing through the channel 104 diffuses through the membranes 108 and 110 respectively into the enclosure 106. The gas passing into the enclosure 106 passes therefrom through the conduit 142, flowmeter 252, the manifold 250, the valve 260 to the difficultly separable gas collection and analysis apparatus 256, valve 258 being kept closed. The collected samples of difficultly separable mixtures are analyzed and the combined separation efficiency of the membranes 108 and 110 operating in tandem relation is determined therefrom.

The above-described procedure employing inert gas mixtures is repeated and a correlation is made of the separation efficiency of the membranes 108 and 110 when employed with inert gases and when employed with $UF_6$ and by means of this correlation determinations of the operation of membranes in the separation of the isotopes of uranium are made on the basis of the results obtained by inert gas tests. Such determinations are preferably made on the basis of calibration of the separation characteristics of a particular type of membrane. The calibration requires a large number of individual tests and the apparatus described above is particularly suitable for such tests.

In carrying out the foregoing procedure it is preferred to use a high cut when diffusively concentrating the $UF_6$ mixture and to use a low cut when concentrating the inert gas mixture. An inert gas mixture found highly satisfactory for this purpose is a mixture of helium and carbon dioxide in approximately equivalent volumes. A high cut procedure involves passing a large percentage, e.g., approximately 90 percent or more of the mixture through the membrane and passing the smaller percentage remaining over and past the membrane without diffusing it therethrough. A low cut procedure involves passing approximately half of the mixture through the diffusion separation membrane and passing the remainder thereof over and past the membrane without causing it to diffuse therethrough. High cut procedures have been found particularly advantageous in separating such difficultly separable isotopic mixtures as the isotopes of uranium in a compound such as uranium hexafluoride, whereas sufficient separation occurs through use of low cut procedures in connection with separating inert gas mixtures, such as mixtures of helium and carbon dioxide, to make the low cut separation of such inert gases satisfactory. Correlation of separation efficiencies produced by the membranes for high molecular weight difficultly separable corrosive mixtures such as uranium hexafluoride with separation efficiencies produced for low molecular weight easily separable inert gaseous mixtures such as helium-carbon dioxide mixtures may be readily accomplished by the method of the present invention in such a manner that predictions may be made, on the basis of preliminary correlation tests, of the separation which may be effected by diffusion separation membranes when used in separating difficultly separable corrosive gaseous mixtures.

The importance of such correlation is apparent when the difficulty of testing membranes for their separation ability with difficultly separable highly corrosive gaseous mixtures is considered. The difficulty of these measurements results largely from the very corrosive nature of the gas. This not only necessitates involved and difficult handling procedures but also involves special precautions with respect to the membrane after the test because of the effect of atmospheric moisture on the membrane which has been exposed to such a corrosive gas. The corrosive gas reacts with the membranes to partially plug the pores thereof and exposure to atmospheric moisture after said pores have been partially closed will result in further and unpredictable closing of the membrane. This difficulty is obviated by testing with inert gases before the membrane is exposed to the highly corrosive gas so that the membrane is situated in the separating apparatus in which it is to be used over an extended period of time when exposure to the corrosive gas finally occurs.

The correlation achievable through use of the presently disclosed apparatus is possible because on one hand the membranes may be employed in tandem relation to separate the highly corrosive difficultly separable mixture employing high cut procedures without danger of excessive back diffusion (which renders such measurements inaccurate when employed with a single rectangular membrane) and on the other hand permits a testing of the individual membranes according to a low cut procedure employing inert gas mixtures. It is not possible employing previously known apparatus to make tests at both high cut and low cut and to correlate the results of these tests without making some change in the arrangement of the membranes. The advantage of the present apparatus is particularly apparent from the above-described example because this example illustrates the use of exactly the same portions of membranes in connection with the testing of the inert gas and the highly corrosive gas both before and after the corrosive effects of the uranium hexafluoride had occurred.

It will be obvious to those familiar with the art that the above-described example is primarily illustrative of apparatus provided by the present invention. Thus, for example, more than two membranes may be employed in tandem relation to multiply the effects resulting from the arrangement of the example given.

Similarly, it will be understood that the apparatus is not useful solely in the separation of mixtures of gas such as uranium hexafluoride and helium-carbon dioxide mixtures. The diffusion process for the separation of gases has proven highly efficient and its application to separation of other gases, such as the separation of the components of air or of natural gas, the isotopes of chlorine or other corrosive gases is clearly within the purview of the present invention. The application of the present invention in the separation of the isotopes of uranium is an indication of the very high efficiency of which the operation of the present apparatus is capable. It is possible to effect a satisfactory separation of the uranium isotopes present in uranium hexafluoride by means of this apparatus. It is also possible to test the separation qualities of membranes for uranium hexafluoride, and in the same apparatus, with the same exposed surface of membrane, to make inert gas separation tests which permit prediction of separation efficiency of more difficultly separable corrosive gases such as uranium hexafluoride, chlorine or others.

Since many embodiments might be made of the present invention and since many changes might be made in the embodiment described, it is to be understood that the foregoing description is to be interpreted as illustrative only and not in a limiting sense.

I claim:

1. A diffuser separator apparatus which comprises a plurality of flow channels in a single stage, each of said channels having an inlet port and an outlet port and a constant cross sectional area between said ports, at least a portion of the defining surface of each of said channels being a diffusion separation membrane, and each of said channels having a different cross sectional area, means for connecting said channels in series so that each successive channel of said series has a smaller cross sectional area than the previous channel of said series, a source of gaseous mixture, individual means for flowing said gaseous mixture to the inlet port of each of said channels, gas receiving and analyzing means, individual means for flowing gas passing from each of said outlet ports and means for flowing gas passing through said membranes to said receiving and analyzing means, and individual means for connecting the outlet port of each channel with the inlet port of the channel having the next smaller cross sectional area.

2. A diffuser separator apparatus which comprises a plurality of rectanguloid flow channels in a single stage, at least one of the walls of which is a diffusion separation membrane, each of said channels having an inlet port and an outlet port situated so that gas flowing through the said ports passes into contact with said diffusion separation membranes, each of said channels having a different cross sectional area, means for connecting said channels in series so that each successive channel of said series has a smaller cross sectional area than the next previous channel of said series, a source of gaseous mixture, individual means for flowing said gaseous mixture to the inlet port of each of said channels, gas receiving and analyzing means, individual means for flowing gas from each of said outlet port and for flowing gas passing through said membrane to said receiving and analyzing means, and individual means for connecting the outlet port of each channel with the inlet port of the channel having the next smaller cross sectional area.

3. A diffuser separator apparatus which comprises two relatively shallow rectanguloid flow channels in a single stage having the same depth, each of said channels having an inlet port and an outlet port at the ends of said rectanguloid, at least one of the walls of each of said channels being a diffusion separation membrane, and each of said rectanguloid channels having a different width, means for connecting said channels in series so that each successive channel of said series has a smaller width than the previous channel of said series, a source of gaseous mixture, individual means for flowing said gaseous mixture to the inlet port of each of said channels, gas receiving and analyzing means, individual means for flowing gas passing from each of said outlet ports and for flowing gas passing through said membrane to said receiving and analyzing means, and individual means for connecting the outlet port of each channel with the inlet port of the channel having the next smaller cross sectional area.

4. A diffuser separator apparatus which comprises, in combination, a base plate having formed therein at least two shallow elongated rectangular recesses, said recesses having the same depth and different widths, diffusion separation membranes mounted in said recesses to form therewith a wider and narrower thin flow channel, gas inlet means formed in said base for conducting gaseous mixture to the inlet of the wider of said flow passages, gas outlet means formed in said base for withdrawing undiffused gas from the outlet end of said wider flow passage, gas inlet means formed in said base for conducting gaseous mixture to the inlet end of the narrower of flow passages, gas outlet means formed in said base for withdrawing undiffused gas at the outlet end of the narrower of said flow passages, means for connecting the outlet end of said wider flow channel to the inlet end of said narrower flow channel, foraminous plates detachably connected to said base plate whereby said plates may be retained in channel forming relation with said recesses and whereby said membrane may be removed and replaced as desired, detachably connectable cap plate, means for sealing said cap plate and base plate to form an enclosed chamber and outlet means in said cap plate for allowing gas to pass from said enclosed chamber to the exterior of said separator unit.

5. A diffuser separator apparatus which comprises, in combination, a base plate having formed therein two shallow elongated rectangular recesses, said recesses having the same depth and length and one of said recesses having a width approximately ten times as great as the other, diffusion separation membranes mounted in said recesses to form therewith a wider and narrower thin flow channel, gas inlet means formed in said base for conducting gaseous mixture to the inlet end of the wider of said flow passages, gas outlet means formed in said base for withdrawing undiffused gas from the outlet end of said wider flow passage, gas inlet means formed in said base for conducting gaseous mixture to the inlet end of the narrower of flow passages, gas outlet means formed in said base for withdrawing undiffused gas at the outlet end of the narrower of said flow passages, means for connecting the outlet of said wider flow channel at the inlet of said narrower flow channel, foraminous plates detachably connected to said base plate so as to retain said membranes in channel forming relation with said recesses whereby said membrane may be removed and replaced as desired, a detachably connected cap plate, means for sealing said cap plate and base plate to form an enclosed chamber and outlet means in said cap plate for allowing gas to pass from said enclosed chamber to the exterior of said separator unit.

\* \* \* \* \*